US012225039B2

(12) United States Patent
Rose

(10) Patent No.: US 12,225,039 B2
(45) Date of Patent: *Feb. 11, 2025

(54) POLICY DRIVEN VULNERABILITY IDENTIFICATION AND REMEDIATION

(71) Applicant: Netskope, Inc., Santa Clara, CA (US)

(72) Inventor: Brandon Edward Rose, Phoeniz, AZ (US)

(73) Assignee: Netskope, Inc., Santa Clara, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 17/555,125

(22) Filed: Dec. 17, 2021

(65) Prior Publication Data
US 2022/0360602 A1 Nov. 10, 2022

Related U.S. Application Data

(63) Continuation of application No. 17/339,525, filed on Jun. 4, 2021, now Pat. No. 11,233,815, which is a
(Continued)

(51) Int. Cl.
*H04L 9/40* (2022.01)
*G06N 5/04* (2023.01)
(Continued)

(52) U.S. Cl.
CPC ........... *H04L 63/1433* (2013.01); *G06N 5/04* (2013.01); *G06N 20/00* (2019.01); *H04L 45/42* (2013.01);
(Continued)

(58) Field of Classification Search
CPC . H04L 63/1433; H04L 45/74; H04L 63/0236; H04L 63/20; G06N 5/04; G06N 20/00
See application file for complete search history.

(56) References Cited

U.S. PATENT DOCUMENTS

| 5,440,723 A | 8/1995 | Arnold et al. |
| 6,513,122 B1 | 1/2003 | Magdych et al. |

(Continued)

FOREIGN PATENT DOCUMENTS

| CN | 109690492 | 4/2019 |
| EP | 1063833 A2 | 12/2000 |

(Continued)

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Beemnet W Dada
(74) *Attorney, Agent, or Firm* — MUGHAL GAUDRY & FRANKLIN PC

(57) ABSTRACT

A system for policy based vulnerability management of a network equipment of an enterprise is disclosed. A plurality of vulnerabilities associated with an end user device and a plurality of policies associated with the plurality of vulnerabilities is identified. Security risks associated with the plurality of vulnerabilities based on a type of the plurality of vulnerabilities are identified. Remediation for the plurality of vulnerabilities is determined based on the plurality of policies and prioritized based on the vulnerabilities, the security risks, and the policies. The plurality of policies is based on a cloud service selected from the end user device, a tenant, and a role associated with the end user device. A route corresponding to the plurality of policies and the cloud service is identified. The route specifies the end user device or a mid-link server. The cloud service is provided to the end user device via the route.

20 Claims, 10 Drawing Sheets

Related U.S. Application Data continuation of application No. 17/315,010, filed on May 7, 2021, now Pat. No. 11,997,127.

(51) Int. Cl.

| | |
|---|---|
| *G06N 20/00* | (2019.01) |
| *H04L 45/42* | (2022.01) |
| *H04L 45/74* | (2022.01) |
| *H04L 67/10* | (2022.01) |

(52) U.S. Cl.
CPC .......... *H04L 45/74* (2013.01); *H04L 63/0236* (2013.01); *H04L 63/20* (2013.01); *H04L 67/10* (2013.01)

(56) References Cited

U.S. PATENT DOCUMENTS

| | | | |
|---|---|---|---|
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,627,891 | B2 | 12/2009 | Williams |
| 7,735,116 | B1 | 6/2010 | Gauvin |
| 7,966,654 | B2 | 6/2011 | Crawford |
| 7,975,286 | B1 | 7/2011 | Fickey |
| 8,000,329 | B2 | 8/2011 | Fendick et al. |
| 8,065,712 | B1 | 11/2011 | Cheng |
| 8,256,002 | B2 | 8/2012 | Chandrashekhar |
| 8,296,178 | B2 | 10/2012 | Hudis et al. |
| 8,499,330 | B1 | 7/2013 | Albisu |
| 8,595,844 | B2 | 11/2013 | Bahl |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,467,465 | B2 | 10/2016 | Hibbert |
| 9,811,662 | B2 | 11/2017 | Sharpe et al. |
| 10,027,538 | B1 * | 7/2018 | Okita ................. H04L 41/5096 |
| 10,033,766 | B2 | 7/2018 | Gubta |
| 10,084,825 | B1 | 9/2018 | Xu |
| 10,142,362 | B2 | 11/2018 | Weith |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,554,418 | B2 * | 2/2020 | Kshirsagar ............ H04L 9/3268 |
| 10,691,796 | B1 | 6/2020 | Stolte |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,201,891 | B2 | 12/2021 | Davis |
| 11,233,815 | B1 | 1/2022 | Rose |
| 11,281,775 | B2 | 3/2022 | Burdett et al. |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2006/0195905 | A1 | 8/2006 | Fudge |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0086376 | A1 | 4/2013 | Haynes |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0259095 | A1 | 9/2014 | Bryant |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250869 | A1 | 8/2017 | Voellmy |
| 2017/0250951 | A1 | 8/2017 | Wang et al. |
| 2017/0359271 | A1 * | 12/2017 | Koh ................... H04L 41/0654 |
| 2017/0373860 | A1 * | 12/2017 | Kshirsagar ............ H04L 67/02 |
| 2018/0137288 | A1 | 5/2018 | Polyakov |
| 2018/0139221 | A1 | 5/2018 | Chen |
| 2020/0050686 | A1 | 2/2020 | Kamalapuram et al. |
| 2020/0242269 | A1 | 7/2020 | Narayanaswamy |
| 2021/0173710 | A1 | 6/2021 | Crossley |
| 2021/0185015 | A1 | 6/2021 | Sapp |
| 2021/0234892 | A1 | 7/2021 | Narayanaswamy |

FOREIGN PATENT DOCUMENTS

| | | |
|---|---|---|
| EP | 3654220 | 5/2020 |
| EP | 2959422 | 10/2021 |
| KR | 101113615 | 2/2012 |
| WO | 2021138299 | 7/2021 |

OTHER PUBLICATIONS

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss- labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGCOMM international conference on Management of data, Jun. 2004, pp. 563-574.

Balakrishnan et al., "A layered naming architecture for the Internet," ACM SIGCOMM Computer Communication Review, 34(4), 2004, pp. 343-352.

(56) References Cited

OTHER PUBLICATIONS

Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~: text=mode of communication.-,What are the different email protocols%3F, and also has defined functions.
NIIT, Special Edition Using Storage Area Networks, Que, 2002, 6 pgs.
Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P. 2000, May 2000, pp. 44-55.
Dean, Tamara, Guide to Telecommunications Technology, Course Technology, 2003, 5 pgs,.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

* cited by examiner

POLICY DRIVEN VULNERABILITY IDENTIFICATION AND REMEDIATION

CROSS-REFERENCES TO RELATED APPLICATIONS

This application is a continuation of U.S. application Ser. No. 17/339,525, entitled "VULNERABILITY REMEDIATION BASED ON TENANT SPECIFIC POLICY," filed on Jun. 4, 2021, which is a continuation of U.S. application Ser. No. 17/315,010 entitled "POLICY BASED VULNERABILITY IDENTIFICATION, CORRELATION, REMEDIATION, AND MITIGATION," filed on May 7, 2021, the contents of which is incorporated by reference in its entirety for all purposes.

BACKGROUND

This disclosure relates in general to vulnerability management in cloud-based multi-tenant systems and, but not by way of limitation, to policy-based vulnerability management and remediation.

Vulnerabilities in multi-tenant systems is often a complicated and convoluted area to manage across multiple vendor platforms and distinct software. Identification and tracking of vulnerabilities are difficult, especially when there are new Common Vulnerabilities and Exposures (CVEs) that are released daily. Remediation of a vulnerability involves patching or upgrading software, which is often intrusive and difficult to achieve, as there are large number of devices involved in an enterprise.

Remediating vulnerabilities in a timely manner becomes strenuous, especially in a multi-tenant system having a distributed work force, or employees working at home. When the employees connect to services and sites from outside a Local Area Network (LAN) of the enterprise, the risks associated with the security of the devices tend to increase.

Many enterprises have a bring your own device (BYOD) policy that allows different platforms, operating systems, and application versions to run with the workplace systems. Identifying threats in these circumstances is hard because of the number of unique systems and software.

SUMMARY

A system for policy based vulnerability management of a network equipment of an enterprise is disclosed. A plurality of vulnerabilities associated with an end user device and a plurality of policies associated with the plurality of vulnerabilities is identified. Security risks associated with the plurality of vulnerabilities based on a type of the plurality of vulnerabilities are identified. Remediation for the plurality of vulnerabilities is determined based on the plurality of policies and prioritized based on the vulnerabilities, the security risks, and the policies. The plurality of policies is based on a cloud service selected from the end user device, a tenant, and a role associated with the end user device. A route corresponding to the plurality of policies and the cloud service is identified. The route specifies the end user device or a mid-link server. The cloud service is provided to the end user device via the route.

In an embodiment, a cloud-based multi-tenant system for policy based vulnerability management of a network equipment of an enterprise. The cloud-based multi-tenant system includes an application running on an end user device of a plurality of end user devices. The application selects a cloud service from a plurality of cloud services. A plurality of routes through the cloud-based multi-tenant system to deliver the plurality of cloud services to the plurality of end user devices. The plurality of routes is specified for a plurality of policies. A mid-link server of the cloud-based multi-tenant system is configured to identify a plurality of vulnerabilities associated with the end user device. Security risks associated with the plurality of vulnerabilities based on a type of the plurality of vulnerabilities The plurality of policies associated with the plurality of vulnerabilities is identified based on the type of the plurality of vulnerabilities and the end user device. The plurality of policies is specified for the plurality of end user devices. Remediation for the plurality of vulnerabilities is determined based on the plurality of policies. The plurality of policies is set based on the cloud service, a tenant, and/or a user role associated with the end user device. The remediation is executed at the end user device or the mid-link server based on a tenant specific policy from the plurality of policies. A route from the plurality of routes is identified corresponding to the plurality of policies and the cloud service. The route specifies the end user device or the mid-link server. The remediation of the plurality of firmware is prioritized based on the type of the plurality of vulnerabilities, the security risks, and the plurality of policies. The remediation of the plurality of firmware is executed by upgrading the plurality of firmware based on the plurality of policies according to the prioritization. Communication is established via the route between the application and the cloud service is based on the plurality of policies.

In another embodiment, a vulnerability identification and remediation method of identifying and remediating vulnerabilities for a network equipment in a cloud-based multi-tenant system of an enterprise is shown. In one step, a selection of a cloud service from a plurality of cloud services is received from an application running on an end user device of a plurality of end user devices. A plurality of vulnerabilities associated with a plurality of firmware of the end user device is identified by a mid-link server. A plurality of policies associated with the plurality of vulnerabilities is identified by the mid-link server based on the type of the plurality of vulnerabilities and the end user device. The plurality of policies is specified for the plurality of end user devices. Remediation for the plurality of vulnerabilities is determined by the mid-link server based on the plurality of policies. The plurality of policies is based on the cloud service, a tenant, and/or a user role associated with the end user device. A route from a plurality of routes is identified by the mid-link server corresponding to the plurality of policies and the cloud service. The route specifies the end user device or the mid-link server. The plurality of routes is specified for the plurality of policies. The plurality of routes through the cloud-based multi-tenant system delivers the plurality of cloud services to the plurality of end user devices. The remediation of the plurality of firmware is prioritized based on the type of the plurality of vulnerabilities, the security risks, and the plurality of policies. The remediation of the plurality of firmware is executed by upgrading the plurality of firmware based on the plurality of policies according to the priority. Communication is established via the route by the mid-link server between the application and the cloud service based on the plurality of policies.

In one embodiment, a cloud-based multi-tenant system for policy-based vulnerability management, the cloud-based multi-tenant system comprising one or more processors and one or more memories with code for:

extracting: configuration items associated with a plurality of firmware of a plurality of end user devices from a configuration database using Application Programming Interfaces (APIs), device configurations including vendor specific information from a device configuration repository, and external vulnerability information including external websites, social media, and/or vendor websites from a plurality of data sources;

correlating the configuration items, the device configurations, and the external vulnerability information; and identifying a plurality of vulnerabilities associated with the plurality of firmware based on the correlation;

receiving from an application running on an end user device of the plurality of end user devices, a selection of a cloud service from a plurality of cloud services;

identifying security risks associated with the plurality of vulnerabilities based on a type of the plurality of vulnerabilities;

identifying a plurality of policies associated with the plurality of vulnerabilities based on the type of the plurality of vulnerabilities and the end user device, wherein the plurality of policies is specified for the plurality of end user devices;

determining remediation for the plurality of vulnerabilities based on the plurality of policies, wherein the plurality of policies is based on the cloud service, a tenant, and/or a user role associated with the end user device;

identifying a route from a plurality of routes corresponding to the plurality of policies and the cloud service, wherein: the route specifies the end user device or a mid-link server of the cloud-based multi-tenant system; the plurality of routes is specified for the plurality of policies; and the plurality of routes through the cloud-based multi-tenant system delivers the plurality of cloud services to the plurality of end user devices;

executing the remediation of the plurality of firmware by upgrading the plurality of firmware based on the plurality of policies; and communicating via the route between the application and the cloud service based on the plurality of policies.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
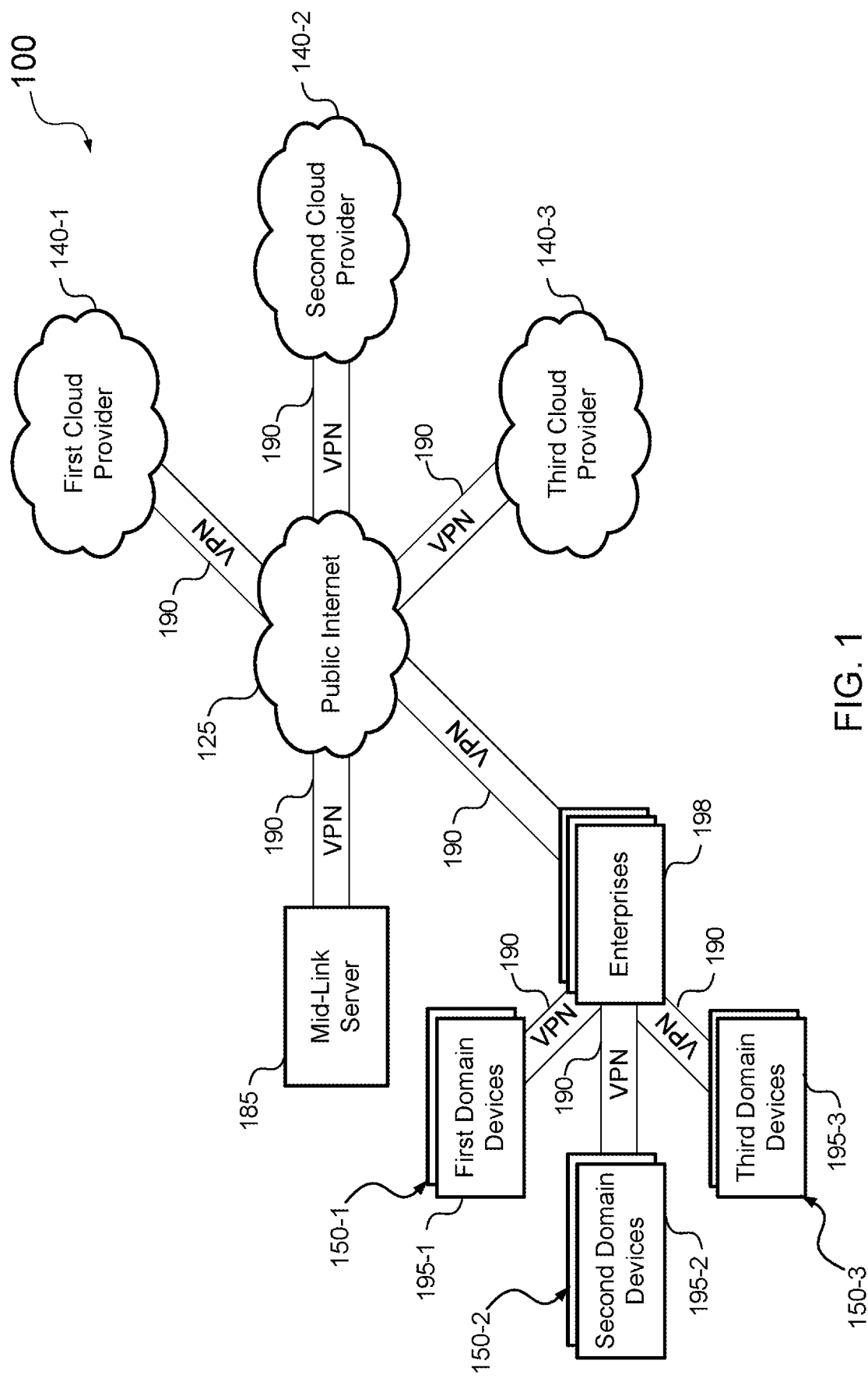
FIG. 1 illustrates a block diagram of an embodiment of a cloud network allowing multiple-tenants in different domains to communicate with various cloud providers over the public internet.

Referring first to FIG. 1, a block diagram of an embodiment of a cloud network 100 allowing multiple-tenants in different domains to communicate with various cloud providers over the public internet is shown. The cloud network 100 allows multiple tenants or enterprises to use the same network separated by domain or some other logical separation. Encryption, leased/encrypted tunnels, firewalls, and/or gateways can be used to keep the data from one enterprise 198 separate from other enterprises 198. Each end user device 195 can communicate with cloud providers 140 of services and storage using a public internet 125. A mid-link server 185 provides multi-tenancy control, policies and routing for each domain.

The cloud network 100 may include a first computing environment 150-1 having end user devices 195-1 for a first domain, a second computing environment 150-2 having end user devices 195-2 for a second domain, and a third computing environment 150-3 having end user devices 195-3 for a third domain. Each domain communicates with its respective enterprise 198 using a virtual private network (VPN) 190 over local area networks (LANs), wide area networks (WANs), and/or the public Internet 125. Instead of a VPN 190 as an end-to-end path, tunneling (e.g., IP-in-IP, GRE), policy-based routing (PBR), BGP/IGP route injection, or proxies could be used. The first cloud provider 140-1, the second cloud provider 140-2, and the third cloud provider 140-3 may be public or private clouds. Some examples of the cloud providers 140 include Amazon Web Services (AWS)®, Google Cloud Platform (GCP)®, and Microsoft Azure®. Some or all of the cloud providers 140 may be different from each other, for example, the first cloud provider 140-1 may run Amazon Web Services (AWS)®, the second cloud provider 140-2 may run Google Cloud Platform (GCP)®, and the third cloud provider 140-3 may run Microsoft Azure®. Although three cloud providers 140 are shown, any suitable number of cloud providers 140 may be provided with some captive to a particular enterprise or otherwise not accessible to multiple domains.

Each of the cloud providers 140 may communicate with the public Internet 125 using a secure connection. For example, the first cloud provider 140-1 may communicate with the public Internet 125 via a virtual private network (VPN) 190, the second cloud provider 140-2 may communicate with the public Internet 125 via a different VPN 190, and the third cloud provider 140-3 may communicate with the public Internet 125 via yet another VPN 190. Some embodiments could use leased connections or physically separated connections to segregate traffic. Although one VPN 190 is shown, it is to be understood that there are many VPNs to support different end user devices, tenants, domains, etc.

A plurality of enterprises 198 may also communicate with the public Internet 125 and the end user devices 195 for their domain via VPNs 190. Some examples of the enterprises 198 may include corporations, educational facilities, governmental entities, and private consumers. Each enterprise may support one or more domains to logically separate their networks. The end user devices 195 for each domain may include individual computers, tablets, servers, handhelds, and network infrastructure that are authorized to use computing resources of their respective enterprise 198.

Further, the mid-link server 185 may communicate with the public Internet 125 via a VPN 190. The mid-link server 185 also provides cloud access security broker (CASB) functionality for cloud security to enterprises 198 with data flows of the CASB being regulated with a global cloud traffic controller (GCTC). Communication between the mid-link server 185 and cloud providers 140 for a given enterprise 198 can be either a VPN connection or tunnel depending on preference of the enterprise 198. The mid-link server 185 may configure, test, and enforce policies and routing across the cloud network 100. For example, the mid-link server 185 may ensure that the policies are consistent across the cloud providers 140, enterprises 198 and computing environments 150. The mid-link server 185 provides proxies to cloud providers and may apply various policies. The connection between end user devices 195 and the mid-link server 185 is over an encrypted VPN or tunnel.

Figure 2:
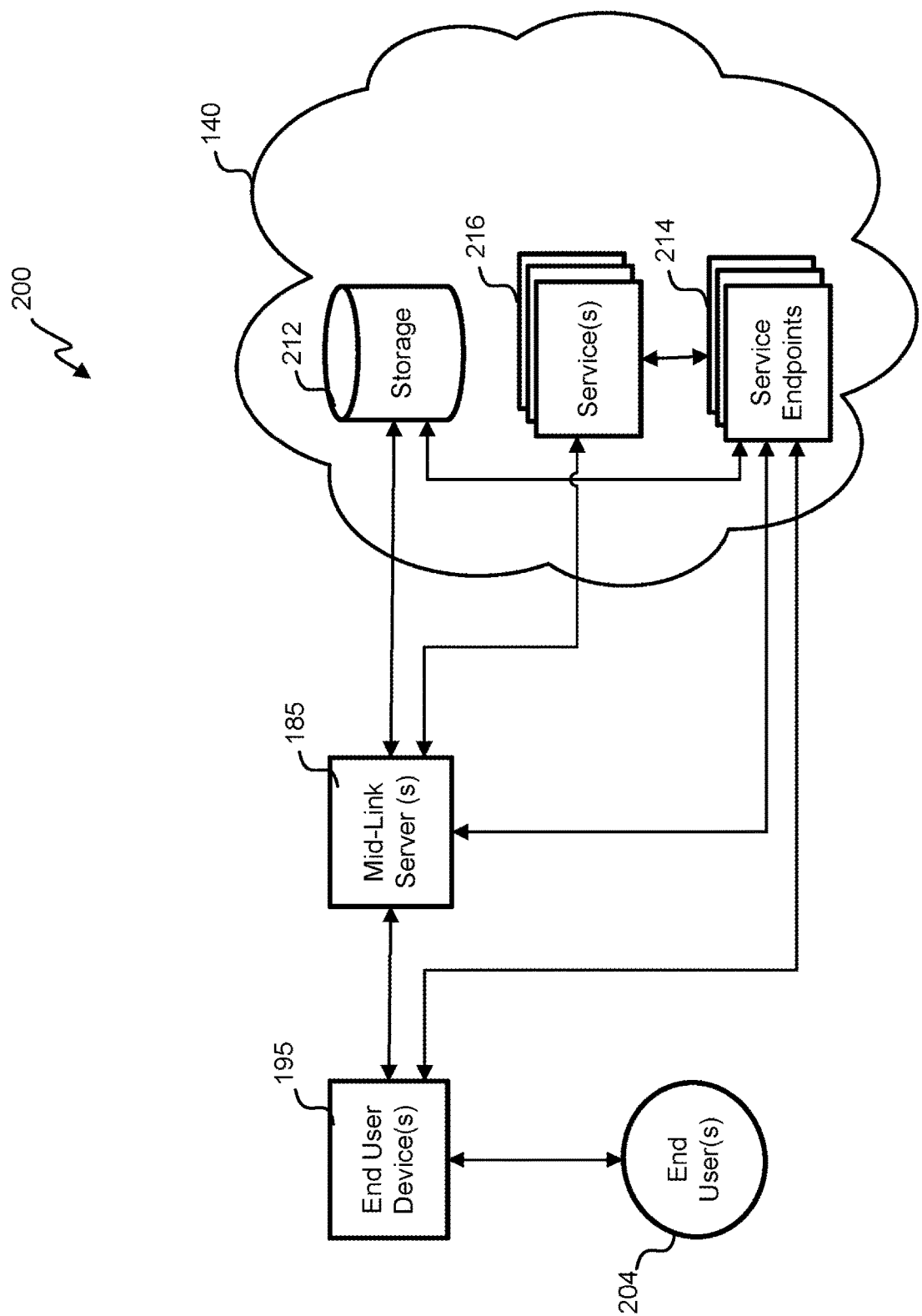
FIG. 2 illustrates a block diagram of an embodiment of a single-tenant cloud network where an end user device communicates with a cloud provider.

With reference to FIG. 2, a block diagram of an embodiment of a single-tenant cloud network 200 where an end user device 195 communicates with a cloud provider 140 is shown. The end user device 195 is operated by an end user 204. The cloud provider 140 is accessible directly or through the mid-link server 185 depending on the route chose, services, policies, etc. Included in the cloud provider 140 are services 216 such as storage 212 that enable applications and functionality on the end user devices 195.

Service endpoints 214 are provided in the cloud provider 140 to enable communication with the mid-link server 185 and end user devices 195. Service endpoints 214 may include VPN terminations and proxies that provide for a secure tunnel with the mid-link server 185 and/or end user devices 195. The mid-link server 185 can optionally connect directly with services 216 and storage 212 of the cloud provider 140 without using the service endpoints 214. In some cases, the end user device 195 communicates with the services 216 and storage 212 through the mid-link server 185 depending on route preference and policies.

Figure 3:
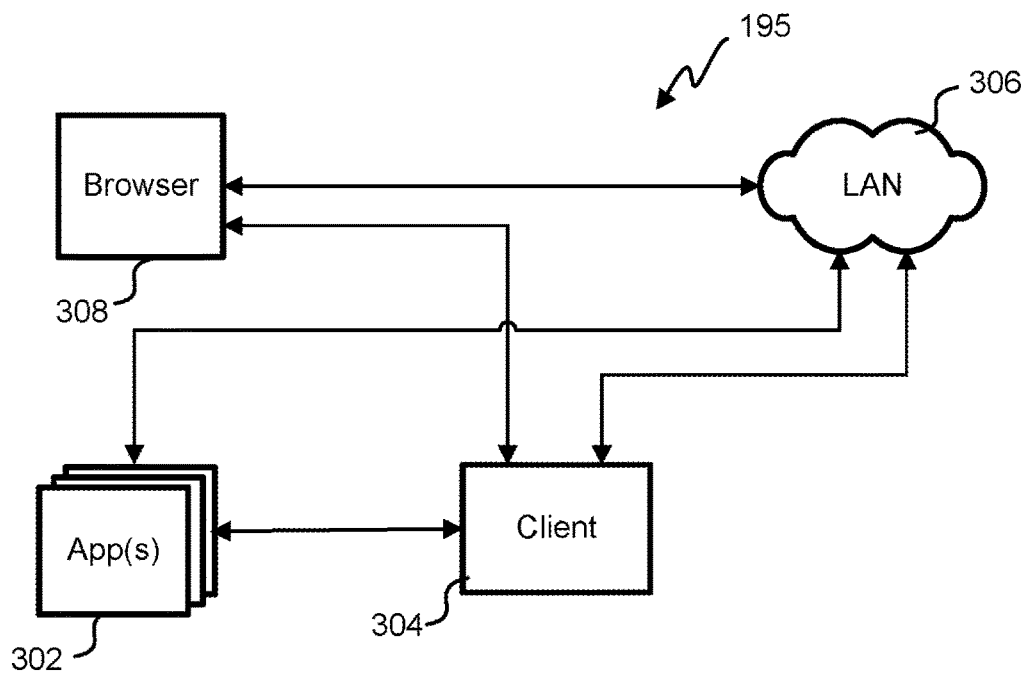
FIG. 3 illustrates a block diagram of an embodiment of an end user device that includes a client for enabling enhanced routing control.

Referring next to FIG. 3, a block diagram of an embodiment of an end user device 195 that includes a client 304 for enabling enhanced routing control is shown. The end user device 195 includes applications 302 and a browser 308 that use the client 304 for communication over the LAN 306 and ultimately to cloud providers 140 (not shown). The browser 308 and the apps 302 can be redirected using domain name services (DNS) to use the client 304. Alternatively, the browser 308 and the apps 302 may natively support the client 304 to utilize Application Programming Interfaces (APIs) or other communication to select policies and receive the corresponding routes.

Figure 4:
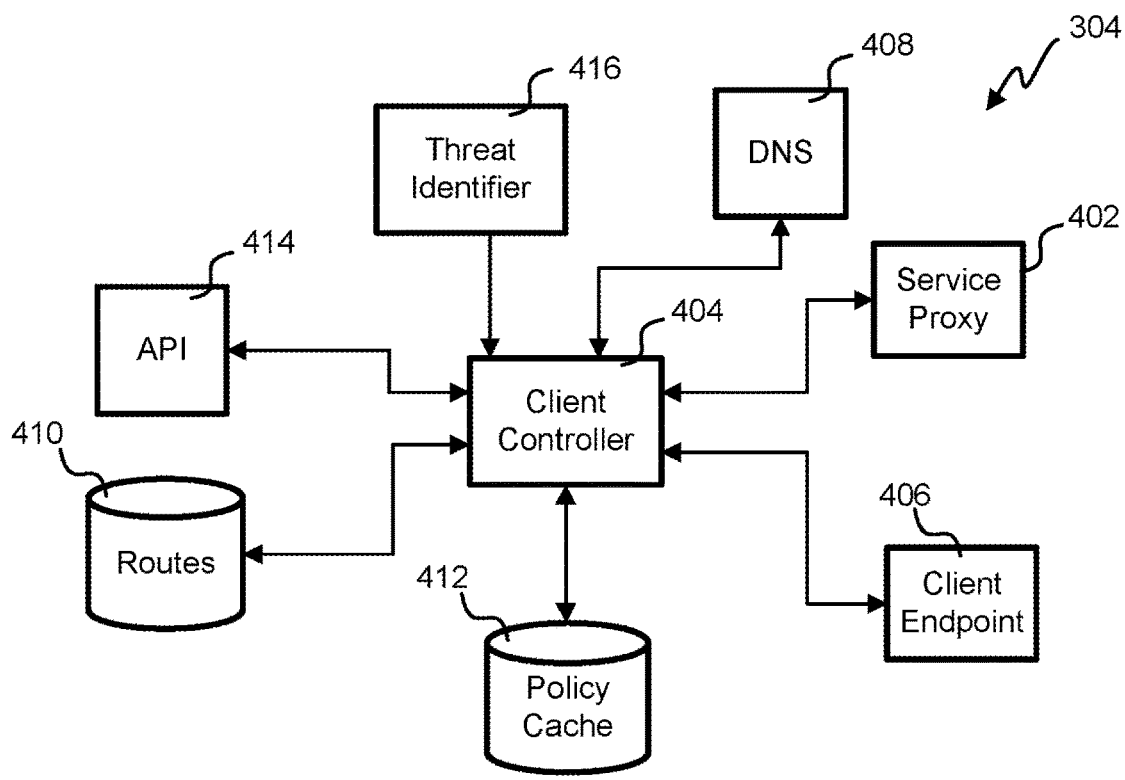
FIG. 4 illustrates a block diagram of an embodiment of a client that can specify by policy routes to be used for cloud services under management of a client controller.

Referring next to FIG. 4, a block diagram of an embodiment of a client 304 is shown that can specify by policy routes to be used for cloud services under the management of a client controller 404. The client controller 404 configures a DNS, fulfills API request, populates routes 410, identifies threats in a threat identifier 416, and a policy cache 412. In operation, the client controller 404 configures data and service requests over the cloud network 100.

The client 304 can be specified for use with a DNS 408 who redirects traffic from browsers 308 and the apps 302 to go through the client 304. Without changing any apps 302 or the browser 308, the client 304 can process traffic for the cloud network 100. The client 304 can operate as a proxy using a service proxy 402 or a VPN using the client endpoint 406. An API 414 is provided for the apps 302 to configure the client 304 if they have that capability. The mid-link server 185 may also configure the client 304.

The mid-link server 185 sends relevant policies to the policy cache 412 to provide functionality to the client 304. The policies allow specifying vulnerabilities, type of remediation and route for the client 304 to use. Table I gives examples of policies along with the target compliance rate before the remediation. For example, policy 1 specifies different routes such as 185-1, 140-2 with 100% compliance, route 185-1, 140-1, 140-2 with 99% compliance, route 185-1, 140-1, 140-2, with 90% compliance, and route 185-4, 140-3 with 70% compliance.

TABLE I

| Policies | | |
|---|---|---|
| Policy | Route | Compliance |
| Policy 1 | 185-1, 140-2 | 100% |
| | 185-1, 140-1, 140-2 | 99% |
| | 185-1, 140-2, 140-2 | 90% |
| | 185-4, 140-3 | 70% |
| Policy 2 | 185-4, 140-6, 195 | 60% |
| Policy 3 | 185-6, 140-5 | 100% |
| | 185-7, 140-2 | 99% |
| | 185-1, 140-3-140-1 | 95% |

Routes 410 are sent for the domain and enterprise 198 by the mid-link server 185.

Where non-compliance with a policy is determined, routes 410, policies and configuration from the mid-link server 185 remediates the problem. The threat identifier 416 receives identified threats, priority and suggested remediation from the mid-link server 185 and displays it to the end user 204 for review. The end user 204 may initiate remediation that is performed by the mid-link server 185.

Figure 5:
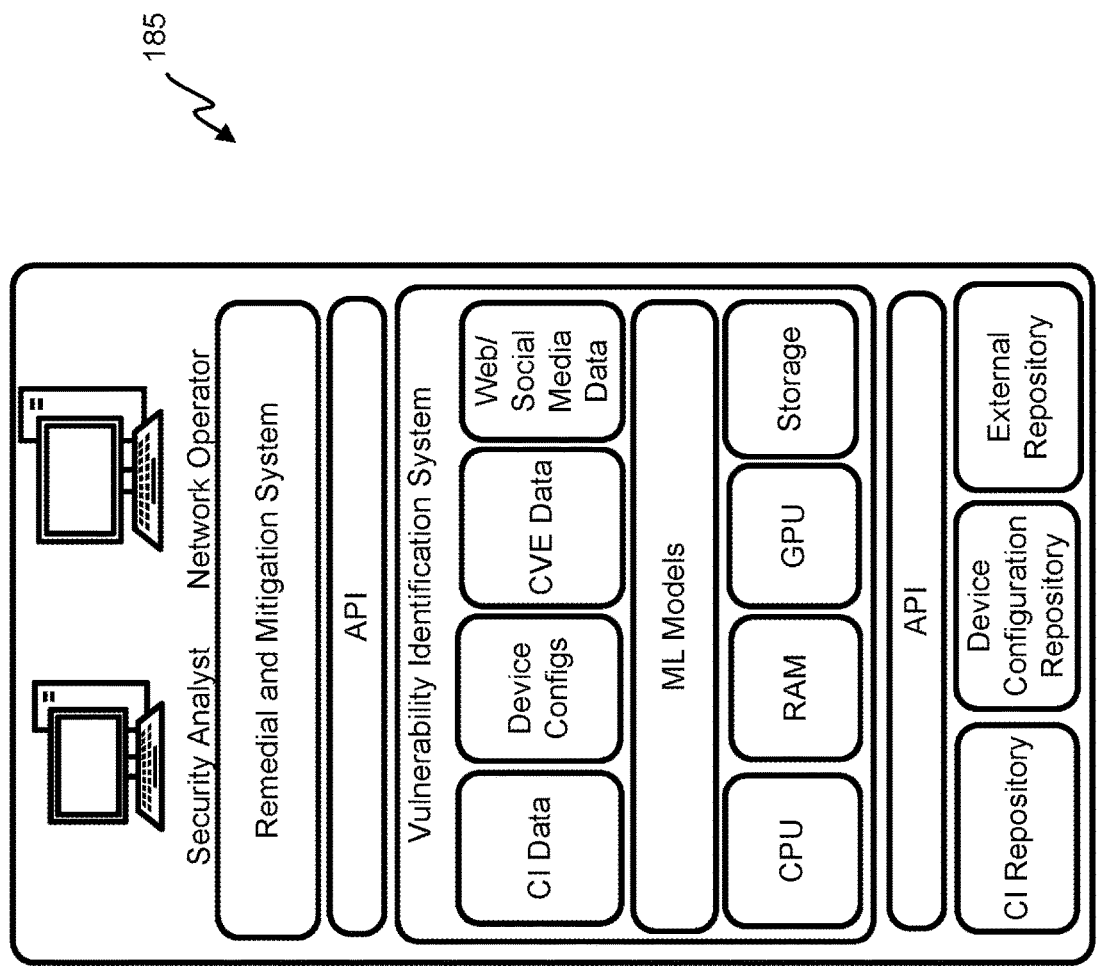
FIG. 5 illustrates an overview of a block diagram of an embodiment of a mid-link server.

Referring next to FIG. 5, an overview of a block diagram of an embodiment of a mid-link server 185 is shown. A security analyst and a network operator have access to analysis performed at the mid-link server 185. Systems of the security analyst and the network operator are interconnected to the mid-link server 185 via the internet. In another embodiment, the security analyst and the network operator may be interconnected through a Local Area Network (LAN) of an enterprise. The security analyst and the network operators may perform remedial actions on the vulnerabilities based on the policies and the determination performed at a remedial and mitigation system of the mid-link server 185.

The remedial and mitigation system of the mid-link server 185 determines remedies to the vulnerabilities based on the policies. The policies include different types of vulnerabilities, and an extent of risk posed by the vulnerabilities. The remedies identified are used to mitigate risks associated with the end user devices 195. An API is used to receive the vulnerabilities from a vulnerability identification system.

The vulnerability identification system identifies the vulnerabilities in firmware, operating system, software, and/or other programs of the end user devices 195 using machine learning (ML) models. The vulnerability identification system correlates configuration items (CI) data including hostnames, IP addresses, models, make, roles, or software versions of the end user devices 195, device configurations including vendor specific information, common vulnerabilities and exposure (CVE) data and external data such as using web or social media data. The correlation is used to determine the vulnerabilities of the end user devices 195. The CI data, the device configurations, the CVE data and the external data are stored in respective repositories. The repository storing the CI data is a configuration item (CI) repository, the device configurations are stored in a device configuration repository, and the external data is stored in an external repository. The API is used for communications between the repositories and the other components of the vulnerability identification system. The vulnerability identification system includes memory that is a random access memory (RAM) and/or any other kind of storage, a processor that is a central processing unit (CPU) and a graphical processing unit (GPU).

Figure 6:
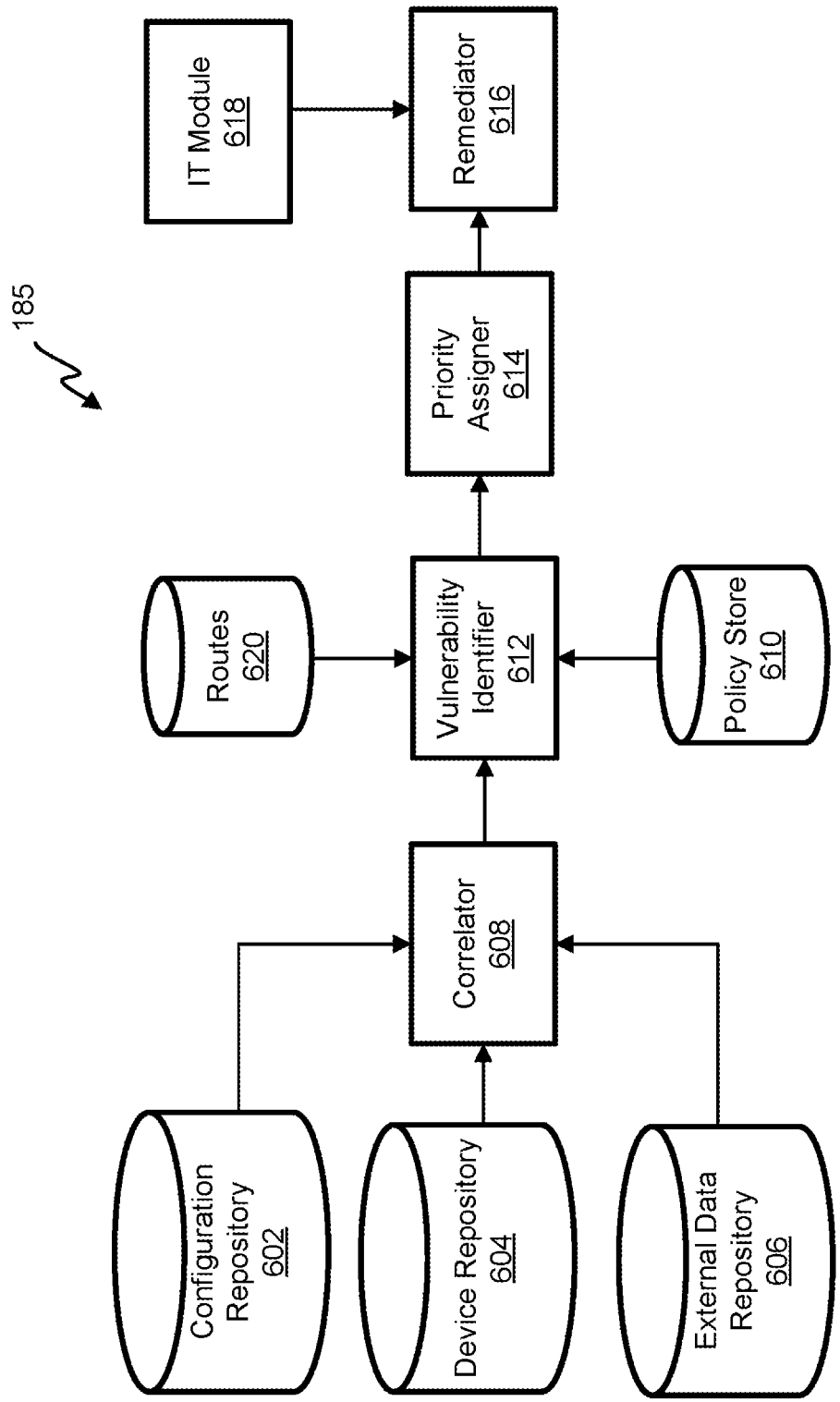
FIG. 6 illustrates a detailed block diagram of an embodiment of a mid-link server.

Referring next to FIG. 6, a detailed block diagram of an embodiment of a mid-link server 185 is shown. The mid-link server 185 is configured to determine vulnerabilities in programs associated with the end user devices 195, and remediate the vulnerabilities based on policies and facilitate communication through routes. The programs may be software applications, firmware, applets or other software codes. The mid-link server 185 includes a configuration repository 602, a device repository 604, an external data repository 606, a correlator 608, a policy store 610, a vulnerability identifier 612, a priority assigner 614, a remediator 616, an Information Technology (IT) module 618, and routes 620.

The configuration repository 602 stores configuration items including hostnames, Internet Protocol (IP) addresses, models, make, roles, or software versions of the end user devices 195. The configuration repository 602 is a database that stores the configuration items. The configuration items are acquired through web crawlers or other data extraction methods. The configuration items are acquired from various sources such as an Information Technology Asset Management (ITAM) and a Configuration Management Data Base (CMDB). These sources track data from IT infrastructure of enterprises among other sources.

The device repository 604 stores device configurations including vendor specific information. A variety of tools exist that can extract network device configurations, store them for reference, restoral, and historical purposes. Different vendors use different ways to format and implement the configurations, which provides a need for a common configuration or data model that may be parsed, analyzed and/or stored. The device configurations provide useful insights on vulnerabilities associated with the end user devices 195.

The external data repository 606 stores common vulnerability and exposures (CVE) information from external websites, social media, vendor websites, and/or National Vulnerability Database (NVD). Vendor websites typically have publicly accessible documentation for security advisories. Some vendors are including "solutions" and "workaround" sections within the CVE. Vendor web pages on vulnerabilities have crucial information. Machine learning capabilities provide an intelligent way to filter out the unnecessary information and extract the relevant information.

The correlator 608 retrieves the configuration items from the configuration repository 602, the device configurations from the device repository 604, and the CVE information from the external data repository 606 using Application Programming Interfaces (APIs). A correlation is performed by the correlator 608 using machine learning techniques. The configuration items, the device configurations and the CVE information are correlated, and a correlation result so obtained is provided to the vulnerability identifier 612 for further processing.

The vulnerability identifier 612 receives the correlation result to determine vulnerabilities associated with the end user devices 195. The vulnerability identifier 612 includes machine learning models that identify the vulnerabilities. The policy store 610 includes the policies as retrieved from the policy cache 412. The policy store 610 includes policies for the end user devices 195. The policies are determined based on a type of vulnerability. The policies specify remediation and a route for remediation. The policies may specify whether the remediation is to be performed at the end user device 195, at the mid-link server 185 or by an administrator (via the IT module 618). The routes corresponding to the policies are determined from the routes 620. The routes are stored and dynamically updated in the routes 620. The routes 620 include paths through the cloud providers 140, the mid-link server 185 and the end user devices 195 to remediate the vulnerabilities. For example, a policy may specify that remediation of a vulnerability related to software updates of an end user device 195 working remotely may be performed at a user device by its user. The route in this case will be through the user device. Another policy for threats in program code attacked by a virus may be performed at the mid-link server 185 or by an administrator. The route in this case will be though the mid-link server 185 or the enterprise software. The vulnerabilities identified by the vulnerability identifier 612 are provided to the priority assigner 614 for further processing.

The priority assigner 614 includes machine learning models to assign priority to the vulnerabilities. The priority assigner 614 identifies a number of factors including the type of vulnerability, risks associated with the vulnerabilities and a time of action for the remediation based on the type of vulnerability and a level of the risks. For example, the priority assigner 614 may also use Common Vulnerability Scoring System (CVSS) or any other threat management system to capture main characteristics of the vulnerability and generate a numerical score reflecting its severity. The numerical score is translated into a qualitative representation such as low, medium, high, and critical to prioritize their remediation and/or vulnerability management processes. Based on the identified factors, each vulnerability is assigned a priority rank. By way of an example, among a set of vulnerabilities, a vulnerability related to a software update of a router may be assigned a lower priority rank as compared to another vulnerability associated with a software on public internet. By way of another example, firmware lacking firewall is assigned a higher priority for the remediation, and firmware that is within a private network or the firmware that do not have public Internet Protocol (IP) addresses are assigned a lower priority of the remediation. The vulnerabilities along with the assigned priorities are provided to the remediator 616 for analysis.

The remediator 616 identifies remediations based on the type of vulnerabilities, the policies, and the level of the risks associated with the vulnerabilities. The remediator 616 initiates remediation of the vulnerabilities in accordance with the assigned priorities. The vulnerabilities with higher priority ranks are remediated first at the end user device 195, the mid-link server 185 or by the enterprise administrator. For example, misconfigured firewalls call for firewall configuration reviewed by the administrator through the mid-link server 185. The remediations are approved at the IT Module 618 before implementation in order to avoid any work-related disruption at the end user device 195.

The IT module 618 provides approvals of the administrators or network operators of the enterprise to the remediator 616 to perform the remediations based on the approvals. The remediations should be performed in a non-intrusive manner. The user of the end user device 195 may be working on an urgent task and/or may need to save the work done before the upgradations or updates start at the end user device 195. In order to perform the updates in non-intrusively it is important to take approvals from the IT module 618. The IT module 618 may also review the priority ranks assigned by the priority assigner 614 and may modify the priority ranks. In this case, the remediations are performed according to the modified priority ranks.

Figure 7:
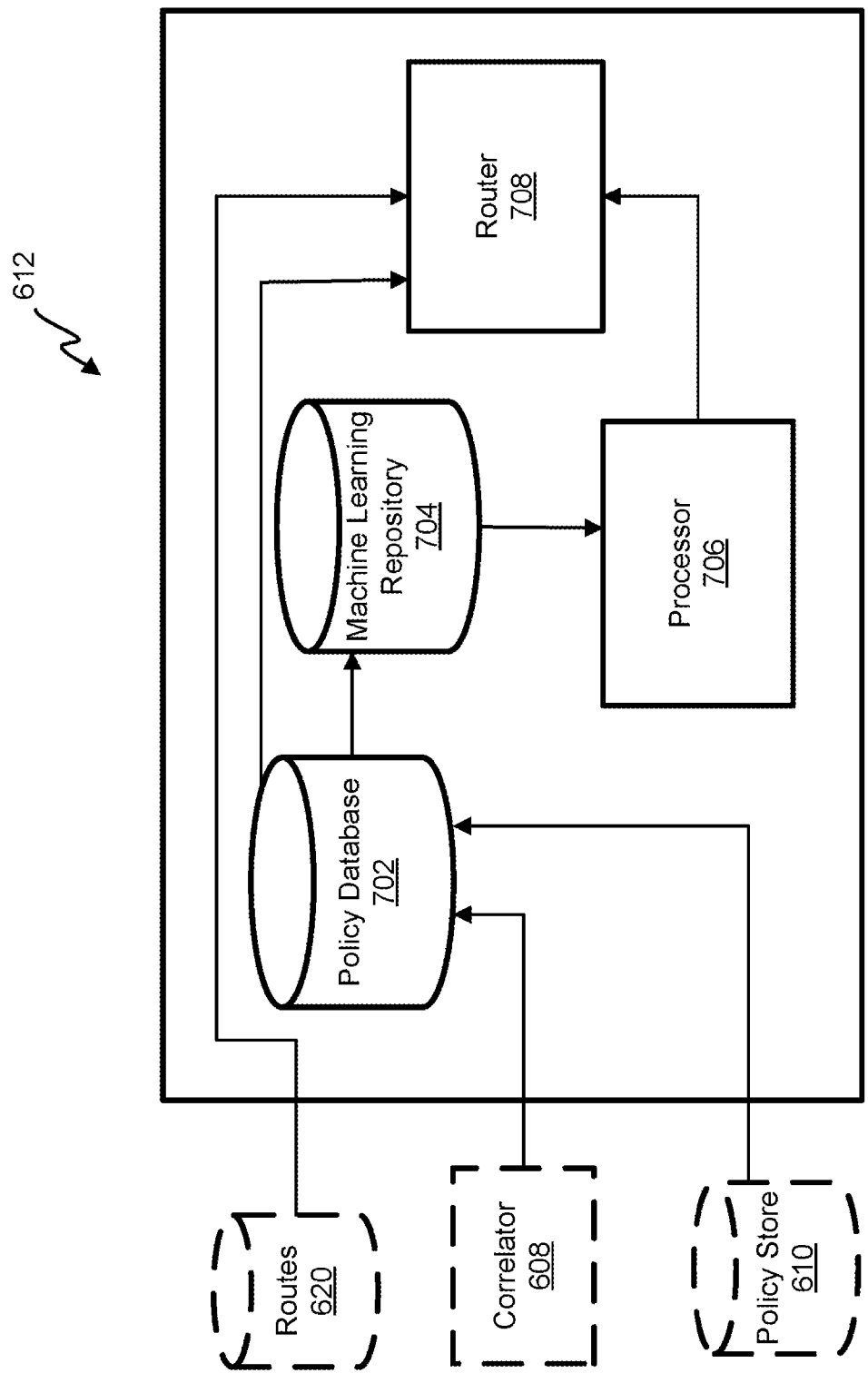
FIG. 7 illustrates a block diagram of an embodiment of a vulnerability identifier.

Referring next to FIG. 7, a block diagram of an embodiment of a vulnerability identifier 612 is shown. The vulnerability identifier 612 receives correlated results from the correlator 608 to identify vulnerabilities associated with the end user devices 195. The vulnerabilities may be in application software, system software or other programs of the end user devices 195. The vulnerability identifier 612 includes a policy database 702, a machine learning repository 704, a processor 706 and a router 708.

The policy database 702 retrieves the correlated results from the correlator 608 and the policies from the policy store 610. The policy database 702 stores the retrieved vulnerabilities and the associated policies. The correlated results are obtained by correlation of configuration items including hostnames, IP addresses, models, make, roles, or software versions, device configurations including vendor specific information related to vulnerabilities and threats, and external data from websites, social media and other public databases.

The machine learning repository 704 includes various machine learning models used to identify the vulnerabilities of the software, operating system, or firmware of the end user devices 195. The machine learning repository 704 uses the correlated results and policies from the policy database 702 to identify specific machine learning model for identification of the vulnerabilities. The machine learning models are trained based on real time vulnerability datasets.

Based on the identification of the machine learning model, the vulnerability is determined by the processor 706. The processor 706 uses the identified machine learning model to process the correlated results to determine the vulnerabilities. The information of the vulnerabilities is provided to the router 708 for further analysis.

The router 708 receives the vulnerabilities determined by the processor 706 and uses the vulnerabilities to identify the respective policies from the policy database 702. Based on the identified policies, routes are further identified for remediation. The routes are identified from the routes 620. For example, vulnerability A has policy B that has routes C, D, F. One of the routes C is identified based on highest compliance with the policies. The remediations are performed through the identified route based on the policy.

Figure 8:
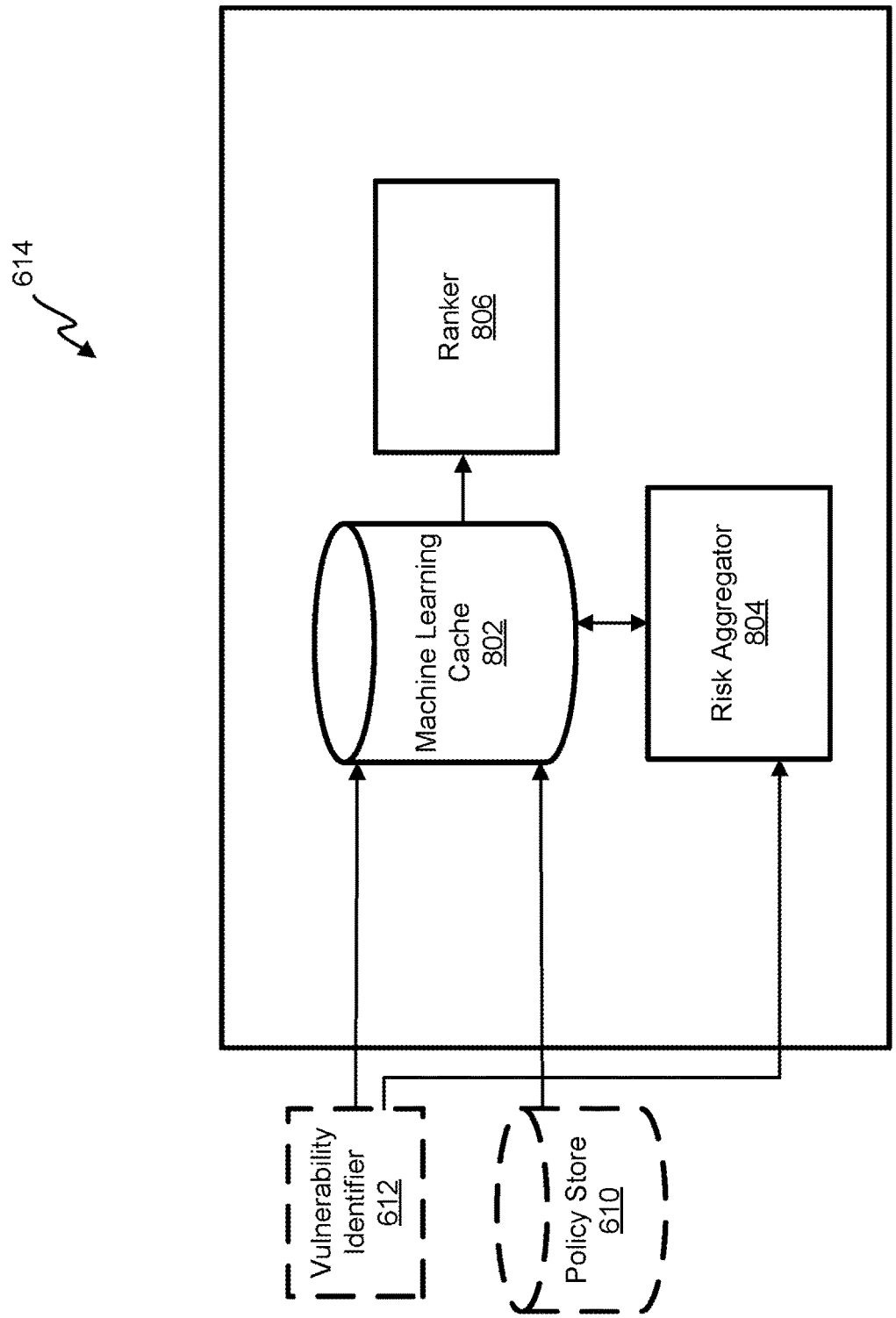
FIG. 8 illustrates a block diagram of a priority assigner.

Referring next to FIG. 8, a block diagram of a priority assigner 614 is shown. The priority assigner 614 is configured to assign priority levels to vulnerabilities identified by the vulnerability identifier 612. The priority assigner 614 includes a machine learning cache 802, a risk aggregator 804, and a ranker 806.

The machine learning cache 802 is a repository of machine learning models for identifying the priority levels for the vulnerabilities. A machine learning model for a specific vulnerability may be identified based on a type of each of the vulnerabilities received from the vulnerability identifier 612 and the respective policies received from the policy store 610. The policies specify a method of addressing the specific type of vulnerabilities. Weights are assigned to the policies based on the end user device 195, role of the end user 204, location of work, connections or other parameters associated with the policies. For example, a policy specifying addressing a malware related vulnerability using a specific firewall or anti-malware software update have a higher weight. Another policy may specify addressing obsolete router software by installing updates at the end user device 195 may have comparatively lower weight. The type of vulnerability, a risk level, and the associated policy weight determines a priority level of remediation of the vulnerability.

The risk aggregator 804 determines risk levels associated with the vulnerabilities received from the vulnerability identifier 612. The risk level is determined based on the type of vulnerability. The risk level identifies a level of a severity of the vulnerability on an end user device 195. The machine learning models determine severity of the vulnerabilities from the data gathered through social media, NVD database, configuration item repositories and vendor supplied information. The severity is used to determine the risk level of the vulnerabilities. The risk level of the vulnerabilities is used by the machine learning models to determine the priority levels of each of the vulnerabilities.

The priority levels of the vulnerabilities are provided to the ranker 806 for assigning ranks or scores to the vulnerabilities. The ranker 806 assigns priority scores or priority ranks and may order the vulnerabilities based on the priority levels. For example, a priority may be scored on a scale of 10-100 with 100 being the highest or the highest priority level may be ranked as '1'. The priority ranks are used for remediation. The remediation is performed in the order of the priority ranks such that the vulnerabilities with higher priority ranks are remediated before the vulnerabilities with lower priority ranks.

Figure 9:
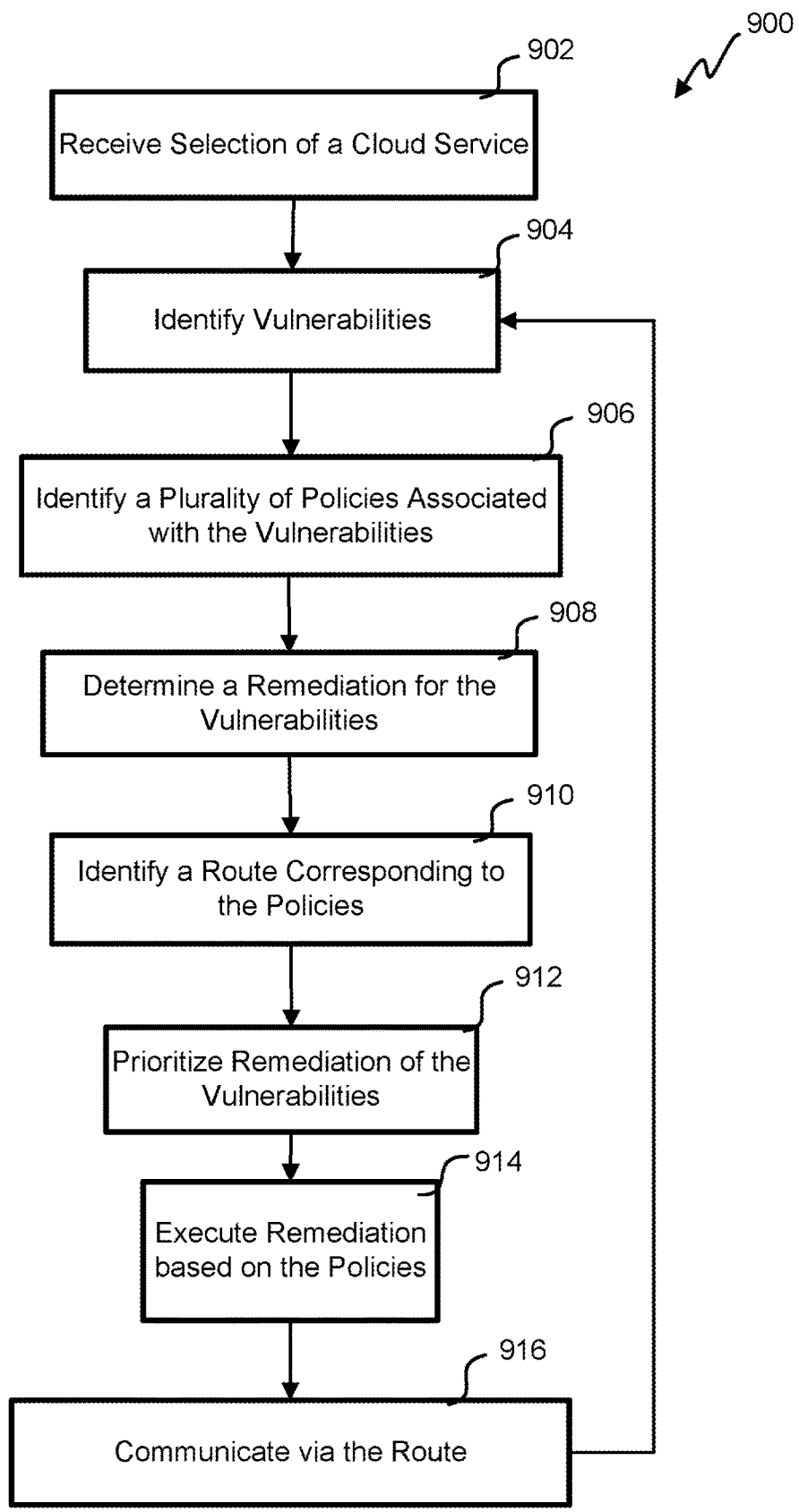
FIG. 9 illustrates a flowchart of an embodiment of a process for policy-driven vulnerability management of network devices in cloud-based multi-tenant systems.

Referring next to FIG. 9, a flowchart of an embodiment of a process for policy-driven vulnerability management of network devices in cloud-based multi-tenant systems is shown. In one embodiment, the network devices may be associated with an enterprise. The network devices may be laptops, computers, mobile phones, routers, servers, databases or any other network equipment associated with an end user 204. The network devices are associated with an end user device 195 of the end user 204. The depicted part of the process begins in block 902 where a cloud service is selected using a local application of the end user device 195 by the end user 204.

At block 904, vulnerabilities associated with software of the network devices are identified using a machine learning algorithm. The vulnerabilities may also be associated with operating system, firmware, freeware, groupware, sharewares, bundled software, programs, application software, system software, or spreadsheet of the end user device 195. Vulnerabilities may be due to weaknesses or threats in the network device's operating system, software or hardware of the network device. Vulnerabilities may arise from poor protocol implementation or specification flaws, misconfiguration of the network device, obsolete software applications installed or stored on the network device, and/or the cloud services associated with the network device. Vulnerabilities may arise from the network connection being used on the network device such as a home WiFi router, a VPN network of a hotel. Further, device features, capabilities, or other communication interfaces and protocols available on the network device influence the vulnerabilities in the network devices.

At block 906, policies associated with the vulnerabilities are identified. Each of the vulnerabilities have an associated policy. For example, a vulnerability of a downgrade software on a WiFi router at home has a policy that entails update of the software at the end user device 195 by the end user 204. A vulnerability associated with a protocol implementation requires latest version of the software to be installed by an administrator at the end user device 195. The policies are based on a tenant including the end user device 195 of the cloud-based multi-tenant system. The policies are based on the cloud service, the tenant, and a role associated with the end user device 195.

At block 908, remediation is determined for the vulnerabilities based on the policies. Remediation includes patching, disabling the vulnerable process or program, removing a vulnerable component, updating or upgrading system configuration, platform and service being used. By way of an example, in case of a malicious software at the end user device 195, a policy specifies remediation by installing an anti-virus software at the end user device 195. The software may be installed by the end user 204, by an administrator, and/or through a link provided by the mid-link server 185. In another embodiment, the policy may specify remediation of a malicious software through the mid-link server 185, where an Intrusion Detection System (IDS) and/or an Intrusion Prevention System (IPS) detects and scrubs known malware signatures as a remediation service.

At block 910, a route is identified corresponding to the policies in order to provide the cloud service at the end user device 195. A number of routes specify the policies through the cloud-based multi-tenant system. The routes terminate with the cloud services across the internet to deliver the cloud services to a number of end user devices 195. The routes are distributed to the end user devices 195 in a number of domains. The domains separate subsets of the end user devices 195 for tenants.

At block 912, the remediations of the vulnerabilities are prioritized using a machine learning algorithm based on a type of the vulnerability, a risk level, and the policies. The risk level is determined based on the type of vulnerability. The risk level identifies a level of an impact of the vulnerability on the network device. The policies determine a manner in which the vulnerabilities are to be remediated. Priority ranks may be assigned to each of the vulnerabilities based on the prioritization. The vulnerabilities may be ordered based on the rank. The vulnerabilities are remediated based on their priority ranks. The vulnerabilities with highest priority ranks are remediated before the vulnerabilities with lower priority ranks.

At block 914, the remediation of the vulnerabilities is performed based on the policies in the order of the priority levels. The remediations may be performed at the end user device 195, at the mid-link server 185 or by the administrator. The end user 204 may perform remediations if specified by the policies. For example, updating firmware of a home router may be performed using a web link at the end user device 195 by the end user 204.

At block 916, the application of the end user device 195 and the cloud service communicate via the route in order to provide the cloud service at the end user device 195. The route corresponds to the policy of the end user device 195. It is further determined whether there are other network devices associated with the end user device 195 for identification of the vulnerabilities. If yes, the process moves to block 904, and the next network device is inspected for vulnerabilities, else the process ends.

Figure 10:
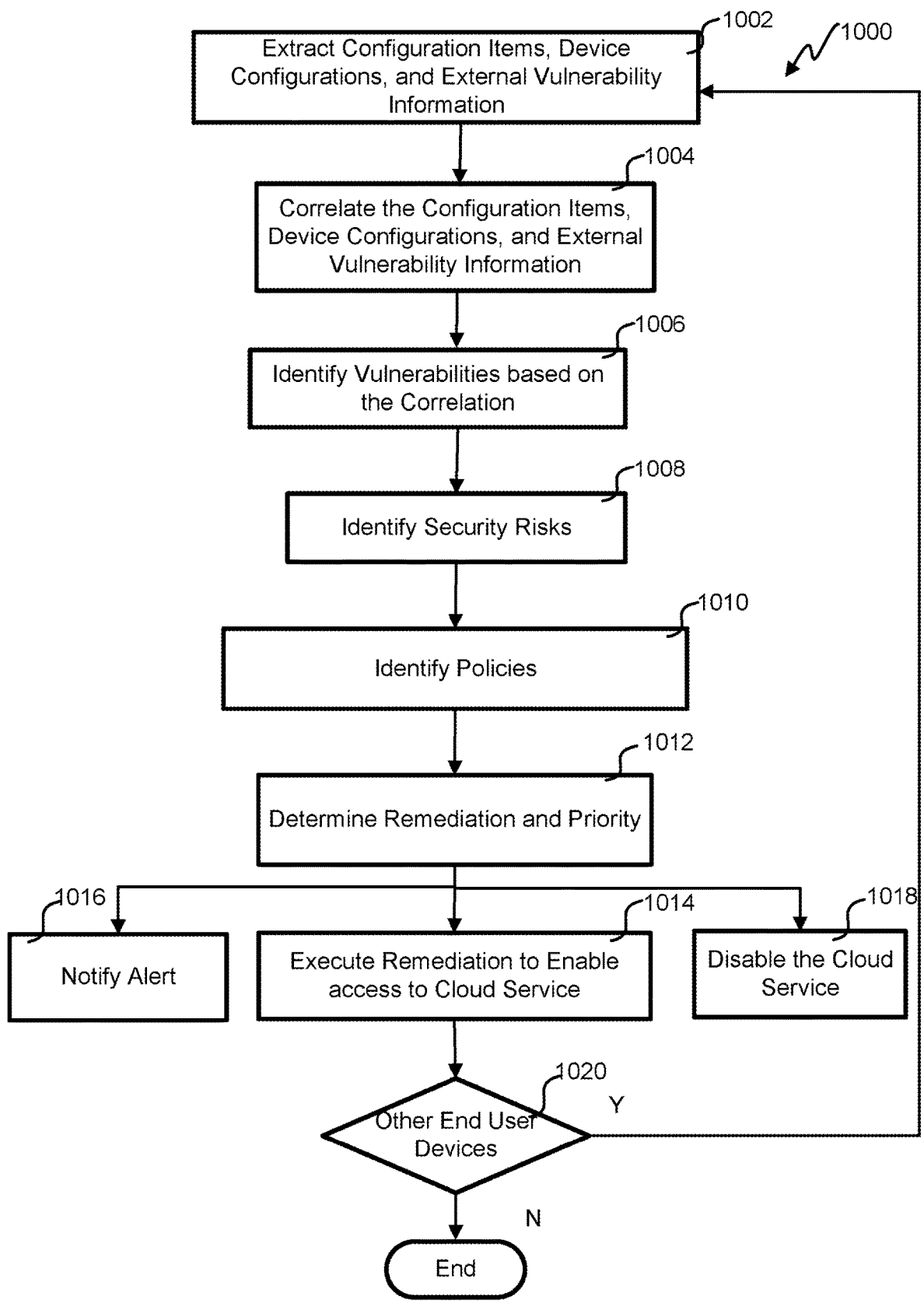
FIG. 10 illustrates a flowchart of an embodiment of a process for policy-driven vulnerability management of network devices and execution of the remediations in cloud-based multi-tenant systems.

Referring next to FIG. 10, a flowchart of an embodiment of a process for policy-driven vulnerability management of network devices and execution of the remediations in cloud-based multi-tenant systems is shown. The depicted portion of the process begins in block 1002 where the mid-link server 185 extracts the configuration items from a configuration repository, device configurations from a device repository, and external vulnerability information from external sources such as social websites, vendor websites, etc. The extracted information is updated in real time. Information relevant to an end user device 195 is filtered from the extracted information. The repositories extract data using web crawlers, publicly accessible APIs, or machine learning models from various vendor databases, NVD database, and other publicly available data sources.

At block 1004, the configuration items, the device configurations, and the external vulnerability information specific to the end user device 195 are correlated by the mid-link server 185.

At block 1006, vulnerabilities of the end user device 195 are identified based on the correlation. The vulnerabilities are associated with a software or operating system of the end user device 195.

At block 1008, security risks associated with the vulnerabilities are identified based on a type of the vulnerability. The security risks signify an impact of the vulnerability on the end user device 195. The security risks identify a threat or damage posed by the vulnerabilities on the end user device 195 if unattended for a period of time.

At block 1010, policies are identified for the vulnerabilities based on the type of vulnerability and the end user device 195. The policies specify a manner in which the vulnerabilities are to be remediated. Each vulnerability has a policy associated with it. The policies are based on a cloud service for the end user device 195, a tenant of the end user device 195, and a role associated with the end user device 195. The policies are stored in the policy store 610. Weights are assigned to the policies based on the end user device 195, a role of the end user 204, a location of work, connections or other protocols associated with the policies.

At block 1012, remediations are determined for the vulnerabilities in accordance with the policies. A priority of remediation is assigned to each of the vulnerabilities based on the type of the vulnerability, the security risk, Common Vulnerability Scoring System (CVSS) scores, and the policies associated with the vulnerability. A policy weight is used in the determination of the priority. Priority ranks or scores may be assigned as the priority for the vulnerabilities. The remediation of the vulnerabilities is performed based on the priority of remediation. The remediations of the vulnerabilities may be performed at the end user device 195 by the end user 204, an administrator, or the mid-link server 185 based on the policies of the vulnerabilities.

At block 1014, based on the policies of the vulnerabilities of the end user device 195, the remediations are performed at the end user device 195 or the mid-link server 185. The cloud service is provided to the end user device 195 after remediation of the vulnerabilities through a route that is determined based on the policies. The route specifies the end user device 195 or the mid-link server 185.

At block 1016, in case the policies specify that the vulnerabilities cannot be remediated at the end user device 195 and requires the administrator to remediate the vulnerability, an alert is notified to the end user device 195. The administrator performs the remediation through the mid-link server 185.

At block 1018, in case the policies specify malicious programs or content to be disabled, the end user device 195 may disable the programs and/or block the malicious content. A notification may be provided to the end user 204 through the end user device 195 regarding the remediation to be performed.

At block 1020, end user devices 195 are identified for vulnerability identification, in case there are other end user devices 195, the process moves to block 1002 else the process ends.

Figure 11:
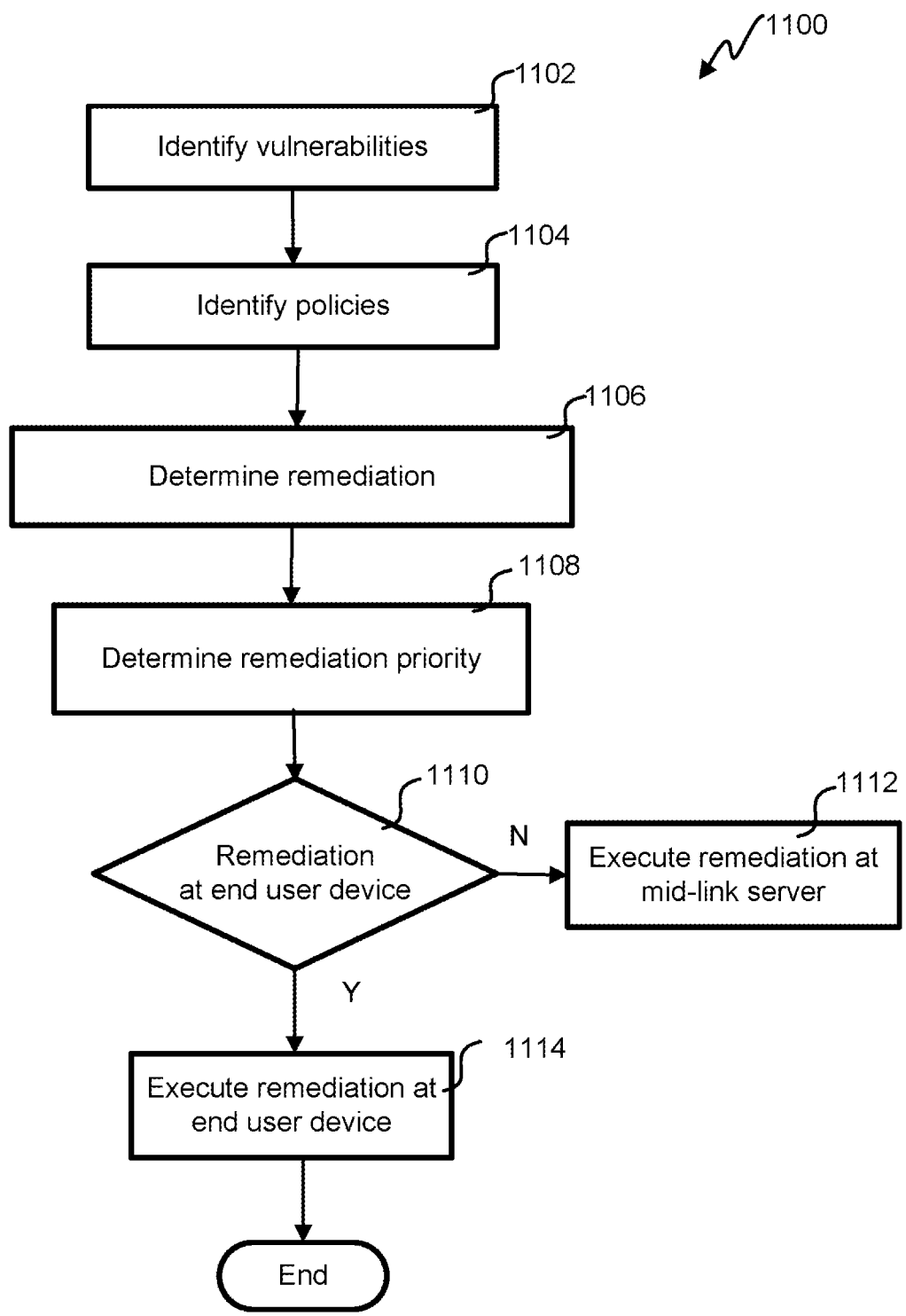
FIG. 11 illustrates a flowchart of an embodiment of a process for policy-driven remediation of vulnerabilities in cloud-based multi-tenant systems.

Referring next to FIG. 11, a flowchart of an embodiment of a process for policy-driven remediation of vulnerabilities in cloud-based multi-tenant systems is shown. The depicted portion of the process begins in block 1102 where the vulnerabilities in a software or an operating system of the end user device 195 are identified.

At block 1104, policies corresponding to the vulnerabilities are identified. The policies are based on a cloud service for the end user device 195, a tenant of the end user device 195, and a role associated with the end user device 195. The policies are determined from the policy store 610. Policies are associated with each of the vulnerabilities.

At block 1106, remediation for the vulnerabilities are determined based on the policies. The remediations include parsing, updating and/or upgrading software prone to vulnerabilities.

At block 1108, a priority of the remediation for each of the vulnerabilities is determined. The priority is determined based on a type of the vulnerability, a risk level of the vulnerability and a policy of the vulnerability. The vulnerabilities are remediated in order of the priority of remediation.

At block 1110, based on the policy associated with the vulnerability, it is determined whether the remediation is performed at the end user device 195 or at the mid-link server 185. If the remediation is determined to be performed at the end user device 195, then at block 1114, the remediation is executed at the end user device 195 by the end user 204. The remediation may be performed using a web browser link or instructions from an administrator. If the remediation is determined to be performed at the mid-link server 185, then at block 1112, the administrator may perform the remediation through the mid-link server 185. The remediation may also be performed automatically using automatic updates or installs through the mid-link server 185.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A cloud-based multi-tenant system for policy based vulnerability management of a network equipment of an enterprise, the cloud-based multi-tenant system comprising:
    an application running on an end user device of a plurality of end user devices that selects a cloud service from a plurality of cloud services;
    a plurality of routes through the cloud-based multi-tenant system to deliver the plurality of cloud services to the plurality of end user devices, wherein:
        the plurality of routes is specified for a plurality of policies; and
    a mid-link server configured to:
        identify a plurality of vulnerabilities associated with a plurality of firmware of the end user device;
        identify security risks associated with the plurality of vulnerabilities based on a type of the plurality of vulnerabilities;
        identify the plurality of policies associated with the plurality of vulnerabilities based on the type of the plurality of vulnerabilities and the end user device, wherein the plurality of policies is specified for the plurality of end user devices;
        determine remediation for the plurality of vulnerabilities based on the plurality of policies, wherein:
            the plurality of policies is set based on the cloud service, a tenant of the end user device, and/or a user role associated with the end user device;
        identify a route from the plurality of routes corresponding to the plurality of policies and the cloud service, wherein the route specifies the end user device or the mid-link server;
        prioritize the remediation of the plurality of firmware based on the type of the plurality of vulnerabilities, the security risks, and the plurality of policies;
        execute the remediation of the plurality of firmware by upgrading the plurality of firmware based on the plurality of policies according to the prioritization; and
        establish communication via the route between the application and the cloud service based on the plurality of policies.

2. The cloud-based multi-tenant system for the policy based vulnerability management of the network equipment of the enterprise as recited in claim 1, wherein:
    the plurality of vulnerabilities is identified based on a first machine learning algorithm; and the remediation of the plurality of vulnerabilities is prioritized using a second machine learning algorithm.

3. The cloud-based multi-tenant system for the policy based vulnerability management of the network equipment of the enterprise as recited in claim 1, wherein the plurality of vulnerabilities associated with the end user device include vulnerabilities associated with at least one of firmware, application software, system software, programs, operating systems, freeware, groupware, shareware, bundled software, or spreadsheets.

4. The cloud-based multi-tenant system for the policy based vulnerability management of the network equipment of the enterprise as recited in claim 1, wherein the remediation is performed by an administrator through the mid-link server.

5. The cloud-based multi-tenant system for the policy based vulnerability management of the network equipment of the enterprise as recited in claim 1, wherein the mid-link server is further configured to:
extract:
configuration items using Application Programming Interfaces (APIs) from a configuration database, wherein the configuration items include hostnames, IP addresses, models, make, roles, or software versions of the plurality of firmware, wherein the plurality of firmware is associated with the plurality of end user devices,
device configurations from a device configuration repository, wherein the device configurations include vendor specific information, and
external vulnerability information from a plurality of data sources including external websites, social media, and/or vendor websites;
correlate the configuration items, the device configurations, and the external vulnerability information; and
identify at least one vulnerability associated with the plurality of firmware based on the correlation.

6. The cloud-based multi-tenant system for the policy based vulnerability management of the network equipment of the enterprise as recited in claim 1, wherein firmware of the plurality of end user devices that are lacking firewalls are assigned a higher priority for the remediation and firmware that is within a private network or the firmware that do not have public Internet Protocol (IP) addresses are assigned a lower priority of the remediation.

7. The cloud-based multi-tenant system for the policy based vulnerability management of the network equipment of the enterprise as recited in claim 1, wherein the plurality of policies varies with each tenant of a plurality of tenants of the cloud-based multi-tenant system.

8. The cloud-based multi-tenant system for the policy based vulnerability management of the network equipment of the enterprise as recited in claim 1, wherein at least one policy from the plurality of policies disables access to the cloud service based on a type of vulnerabilities associated with the end user device.

9. A vulnerability identification and remediation method for a network equipment in a cloud-based multi-tenant system of an enterprise, the method comprising:
receiving from an application running on an end user device of a plurality of end user devices, a selection of a cloud service from a plurality of cloud services;
identifying at a mid-link server, a plurality of vulnerabilities associated with a plurality of firmware of the end user device;
identifying security risks associated with the plurality of vulnerabilities based on a type of the plurality of vulnerabilities;
identifying at the mid-link server, a plurality of policies associated with the plurality of vulnerabilities based on the type of the plurality of vulnerabilities and the end user device, wherein the plurality of policies is specified for the plurality of end user devices;
determining at the mid-link server, remediation for the plurality of vulnerabilities based on the plurality of policies, wherein the plurality of policies is based on the cloud service, a tenant of the end user device, and/or a user role associated with the end user device;
identifying at the mid-link server, a route from a plurality of routes corresponding to the plurality of policies and the cloud service, wherein:
the route specifies the end user device or the mid-link server;
the plurality of routes is specified for the plurality of policies; and
the plurality of routes through the cloud-based multi-tenant system delivers the plurality of cloud services to the plurality of end user devices;
prioritizing at the mid-link server, the remediation of the plurality of firmware based on the type of the plurality of vulnerabilities, the security risks, and the plurality of policies;
executing remediation of the plurality of firmware by upgrading the plurality of firmware based on the plurality of policies according to the priority; and
establishing by the mid-link server, communication via the route between the application and the cloud service based on the plurality of policies.

10. The vulnerability identification and remediation method for the network equipment in the cloud-based multi-tenant system of the enterprise as recited in claim 9, further comprising:
extracting:
configuration items using Application Programming Interfaces (APIs) from a configuration database, wherein the configuration items include hostnames, IP addresses, models, make, roles, or software versions of the plurality of firmware, wherein the plurality of firmware is associated with the plurality of end user devices,
device configurations from a device configuration repository, wherein the device configurations include vendor specific information, and
external vulnerability information from a plurality of data sources including external websites, social media, and/or vendor websites;
correlating the configuration items, the device configurations, and the external vulnerability information; and
identifying at least one vulnerability associated with the plurality of firmware based on the correlation.

11. The vulnerability identification and remediation method for the network equipment in the cloud-based multi-tenant system of the enterprise as recited in claim 9, wherein firmware lacking firewall is assigned a higher priority for the remediation.

12. The vulnerability identification and remediation method for the network equipment in the cloud-based multi-tenant system of the enterprise as recited in claim 9, wherein the plurality of vulnerabilities associated with the end user device include vulnerabilities associated with at least one of firmware, application software, system software, programs, operating systems, freeware, groupware, shareware, bundled software, or spreadsheets.

13. The vulnerability identification and remediation method for the network equipment in the cloud-based multi-tenant system of the enterprise as recited in claim 9, wherein firmware that is within a private network or the firmware that do not have public Internet Protocol (IP) addresses are assigned a lower priority of remediation.

14. The vulnerability identification and remediation method for the network equipment in the cloud-based multi-tenant system of the enterprise as recited in claim 9, wherein the plurality of policies varies with each tenant of a plurality of tenants of the cloud-based multi-tenant system.

15. The vulnerability identification and remediation method for the network equipment in the cloud-based multi-tenant system of the enterprise as recited in claim 9, wherein the remediation is performed by an administrator through the mid-link server.

16. A cloud-based multi-tenant system for policy-based vulnerability management, the cloud-based multi-tenant system comprising one or more processors and one or more memories with code for:
    extracting:
        configuration items associated with a plurality of firmware of a plurality of end user devices from a configuration database using Application Programming Interfaces (APIs),
        device configurations including vendor specific information from a device configuration repository, and
        external vulnerability information including external websites, social media, and/or vendor web sites from a plurality of data sources;
    correlating the configuration items, the device configurations, and the external vulnerability information; and
    identifying a plurality of vulnerabilities associated with the plurality of firmware based on the correlation;
    receiving from an application running on an end user device of the plurality of end user devices, a selection of a cloud service from a plurality of cloud services;
    identifying security risks associated with the plurality of vulnerabilities based on a type of the plurality of vulnerabilities;
    identifying a plurality of policies associated with the plurality of vulnerabilities based on the type of the plurality of vulnerabilities and the end user device, wherein the plurality of policies is specified for the plurality of end user devices;
    determining remediation for the plurality of vulnerabilities based on the plurality of policies, wherein the plurality of policies is based on the cloud service, a tenant of the end user device, and/or a user role associated with the end user device;
    identifying a route from a plurality of routes corresponding to the plurality of policies and the cloud service, wherein:
        the route specifies the end user device or a mid-link server of the cloud-based multi-tenant system;
        the plurality of routes is specified for the plurality of policies; and
        the plurality of routes through the cloud-based multi-tenant system delivers the plurality of cloud services to the plurality of end user devices;
    executing the remediation of the plurality of firmware by upgrading the plurality of firmware based on the plurality of policies; and
    communicating via the route between the application and the cloud service based on the plurality of policies.

17. The cloud-based multi-tenant system for the policy-based vulnerability management as recited in claim 16, further comprising prioritizing the remediation of the plurality of firmware based on the type of the plurality of vulnerabilities, the security risks, and the plurality of policies.

18. The cloud-based multi-tenant system for the policy-based vulnerability management as recited in claim 16, wherein the plurality of policies varies with each tenant of a plurality of tenants of the cloud-based multi-tenant system.

19. The cloud-based multi-tenant system for the policy-based vulnerability management as recited in claim 16, wherein the remediation is performed by an administrator through the mid-link server.

20. The cloud-based multi-tenant system for the policy-based vulnerability management as recited in claim 16, wherein the configuration items include hostnames, IP addresses, models, make, roles, or software versions of the plurality of firmware.

\* \* \* \* \*